(12) United States Patent
Uzkent et al.

(10) Patent No.: US 12,394,190 B2
(45) Date of Patent: Aug. 19, 2025

(54) METHOD AND APPARATUS FOR CLASSIFYING IMAGES USING AN ARTIFICIAL INTELLIGENCE MODEL

(71) Applicant: SAMSUNG ELECTRONICS CO., LTD., Suwon-si (KR)

(72) Inventors: Burak Uzkent, Mountain View, CA (US); Vasili Ramanishka, Mountain View, CA (US); Yilin Shen, Santa Clara, CA (US); Hongxia Jin, San Jose, CA (US)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 713 days.

(21) Appl. No.: 17/701,209

(22) Filed: Mar. 22, 2022

(65) Prior Publication Data
US 2022/0309774 A1   Sep. 29, 2022

Related U.S. Application Data

(60) Provisional application No. 63/165,500, filed on Mar. 24, 2021.

(51) Int. Cl.
*G06V 10/00*    (2022.01)
*G06V 10/764*   (2022.01)
*G06V 10/82*    (2022.01)

(52) U.S. Cl.
CPC ........... *G06V 10/82* (2022.01); *G06V 10/764* (2022.01)

(58) Field of Classification Search
CPC ... G06V 10/82; G06V 10/764; G06V 382/158
See application file for complete search history.

(56) References Cited

U.S. PATENT DOCUMENTS 10,789,427 B2    9/2020  Shazeer et al.
10,936,907 B2 *  3/2021  Suresh ............... G06V 10/82
(Continued)

FOREIGN PATENT DOCUMENTS

CN    113658322 A    11/2021
CN    113688813 A    11/2021
(Continued)

OTHER PUBLICATIONS

Alexey Doscovitskiy et al., "An Image is Worth 16×16 Words: Transformers for Image Recognition at Scale," arXiv:2010.11929v2, pp. 1-22, Jun. 3, 2021.
(Continued)

*Primary Examiner* — Khai M Nguyen
(74) *Attorney, Agent, or Firm* — Sughrue Mion, PLLC

(57) ABSTRACT

An apparatus for performing image processing, may include at least one processor configured to: input an image to a vision transformer comprising a plurality of encoders that correspond to at least one fixed encoder and a plurality of adaptive encoders; process the image via the at least one fixed encoder to obtain image representations; determine one or more layers of the plurality of adaptive encoders to drop, by inputting the image representations to a policy network configured to determine layer dropout actions for the plurality of adaptive encoders; and obtain a class of the input image using remaining layers of the plurality of adaptive encoders other than the dropped one or more layers.

20 Claims, 11 Drawing Sheets

(56) References Cited

U.S. PATENT DOCUMENTS

| | | |
|---|---|---|
| 11,093,819 B1 | 8/2021 | Li et al. |
| 11,138,392 B2 | 10/2021 | Chen et al. |
| 11,494,660 B2 | 11/2022 | Chidlovskii |
| 11,600,087 B2 * | 3/2023 | Chukka ................ G06V 10/454 |
| 2020/0202168 A1 | 6/2020 | Mao et al. |
| 2020/0320402 A1 | 10/2020 | Yoon et al. |
| 2021/0150252 A1 | 5/2021 | Sarlin et al. |
| 2021/0255862 A1 | 8/2021 | Volkovs et al. |
| 2021/0294834 A1 * | 9/2021 | Mai ........................ G06V 10/25 |
| 2021/0334475 A1 | 10/2021 | He et al. |
| 2022/0036564 A1 | 2/2022 | Ye et al. |
| 2022/0292341 A1 * | 9/2022 | Mehta ................... G06T 3/4007 |
| 2023/0140474 A1 * | 5/2023 | Ji ......................... G06V 10/454 706/15 |
| 2023/0169746 A1 * | 6/2023 | Dwivedi ............... G06F 18/214 382/128 |

FOREIGN PATENT DOCUMENTS

| | | |
|---|---|---|
| CN | 112861917 B | 12/2021 |
| KR | 10-2016-0034814 A | 3/2016 |

OTHER PUBLICATIONS

International Search Report and Written Opinion(PCT/ISA/210, PCT/ISA/220, and PCT/ISA/237), dated Dec. 20, 2022, issued by the International Searching Authority, Application No. PCT/KR2022/012888.

Extended European Search Report issued Apr. 10, 2025 in European Patent Application No. 22933766.2.

Lingchen Meng et al., "AdaViT: Adaptive Vision Transformers for Efficient Image Recognition", 2021, XP093263160, pp. 1-12.

Zuxuan Wu et al., "BlockDrop: Dynamic Inference Paths in Residual Networks", IEEE/CVF Conference on Computer Vision and Pattern Recognition, 2018, XP033473806, pp. 8817-8826.

* cited by examiner

METHOD AND APPARATUS FOR CLASSIFYING IMAGES USING AN ARTIFICIAL INTELLIGENCE MODEL

CROSS-REFERENCE TO RELATED APPLICATIONS

This application is based on and claims priority under 35 U.S.C. § 119 from U.S. Provisional Application No. 63/165,500 filed on Mar. 24, 2021, in the U.S. Patent and Trademark Office, the disclosure of which is incorporated by reference herein in its entirety.

BACKGROUND

1. Field

The disclosure relates to a method and an apparatus for identifying classes of images using an artificial intelligence (AI) model, and particularly for predicting an image class via a vision transformer that uses a variable number of neural network layers that changes according to characteristics of an input image.

2. Description of Related Art

Vision transformers have shown promising performance on many challenging computer vision benchmarks including image recognition and object detection. As a result, vision transformers are considered as a new model type that can replace existing vision models.

Vision transformers may outperform convolutional neural networks on challenging computer vision benchmarks. However, vision transformers may contain a large number of parameters, run with high latency, and require a large number of floating point operations per second (FLOPs). As a result, deploying vision transformers to mobile devices may be complicated and costly. To simplify the deployment of vision transformers, there has been a demand for additional methods to improve efficiency of vision transformers.

SUMMARY

Example embodiments address at least the above problems and/or disadvantages and other disadvantages not described above. Also, the example embodiments are not required to overcome the disadvantages described above, and may not overcome any of the problems described above.

One or more example embodiments provide a method and a system for processing an input image using an adaptive number of sampled multi-headed self-attention (MSA) and multilayer perceptron (MLP) layers of a vision transformer, wherein the number of the sampled MSA and MLP layers changes according to the input image.

Further, one or more example embodiments provide a method and a system for using a relatively small number of MSA and MLP layers for simple images, and using a relatively large number of MSA and MLP layers for complex images. As a result, the vision transformer may use a less number of MSA and MLP layers per image on average, compared with a fixed vision transformer where all the MSA and MLP layers are used regardless of the complexity of an input image. Therefore, the vision transformer according to embodiments may increase a runtime speed and may reduce the amount of FLOPs.

In accordance with an aspect of the disclosure, there is provided an apparatus for performing image processing, the apparatus including: a memory storing instructions; and at least one processor configured to execute the instructions to: input an image to a vision transformer comprising a plurality of encoders that correspond to at least one fixed encoder and a plurality of adaptive encoders; process the image via the at least one fixed encoder to obtain image representations; determine one or more layers of the plurality of adaptive encoders to drop, by inputting the image representations to a policy network configured to determine layer dropout actions for the plurality of adaptive encoders; and obtain a class of the input image using remaining layers of the plurality of adaptive encoders other than the dropped one or more layers.

Each of the plurality of encoders may include a multi-head self-attention (MSA) layer and a multilayer perceptron (MLP) layer.

The layer dropout actions may indicate whether each multi-head self-attention (MSA) layer and each multilayer perceptron (MLP) layer included in the plurality of adaptive encoders is dropped or not.

The policy network may include a first policy network configured to determine whether to drop one or more multi-head self-attention (MSA) layers, and a second policy network configured to determine whether to drop one or more multilayer perceptron (MLP) layers.

The first policy network may receive, as input, the image representations that are output from the at least one fixed encoder of the vision transformer, and output the layer dropout actions for each MSA layer of the plurality of adaptive encoders.

The second policy network may be further configured to receive, as input, the image representations and the layer dropout actions for each MSA layer, and output the layer dropout actions for each MLP layer of the plurality of adaptive encoders.

The second policy network may include a dense layer configured to receive, as input, a concatenation of the image representations and the layer dropout actions for each MSA layer.

The policy network may be configured to receive a reward that is calculated based on a number of the dropped one or more layers, and image classification prediction accuracy of the vision transformer.

The at least one processor may be further configured to execute the instructions to: calculate the reward using a reward function that increases the reward as the number of the dropped one or more layers increases and the image classification prediction accuracy increase.

In accordance with another aspect of the disclosure, there is provided a method of performing image processing, the method being performed by at least one processor, and the method including: inputting an image to a vision transformer comprising a plurality of encoders that correspond to at least one fixed encoder and a plurality of adaptive encoders; processing the image via the at least one fixed encoder to obtain image representations; determining one or more layers of the plurality of adaptive encoders to drop, by inputting the image representations to a policy network configured to determine layer dropout actions for the plurality of adaptive encoders; and obtaining a class of the input image using remaining layers of the plurality of adaptive encoders other than the dropped one or more layers.

Each of the plurality of encoders comprises a multi-head self-attention (MSA) layer and a multilayer perceptron (MLP) layer.

The layer dropout actions may indicate whether each multi-head self-attention (MSA) layer and each multilayer perceptron (MLP) layer included in the plurality of adaptive encoders is dropped or not.

The determining the one or more layers of the plurality of adaptive encoders to drop, may include: determining whether to drop one or more multi-head self-attention (MSA) layers, via a first policy network; and determining whether to drop one or more multilayer perceptron (MLP) layers, via a second policy network.

The determining whether to drop the one or more multi-head self-attention (MSA) layers, may include: inputting the image representations that are output from the at least one fixed encoder of the vision transformer, to the first policy network; and outputting the layer dropout actions for each MSA layer of the plurality of adaptive encoders, from the at least one convolutional neural network of the first policy network.

The determining whether to drop the one or more multilayer perceptron (MLP) layers, may include: inputting, to the second policy network, the image representations and the layer dropout actions for each MSA layer; and outputting the layer dropout actions for each MLP layer of the plurality of adaptive encoders, from the second policy network.

The method may further include: concatenating the image representations and the layer dropout actions for each MSA layer; and inputting a concatenation of the image representations and the layer dropout actions for each MSA layer, to a dense layer of the second policy network.

The policy network may be trained using a reward function that calculates a reward based on a number of the dropped one or more layers, and image classification prediction accuracy of the vision transformer.

The reward function may increase the reward as the number of the dropped one or more layers increases and the image classification prediction accuracy increase.

In accordance with another aspect of the disclosure, there is provided a non-transitory computer-readable storage medium storing instructions that, when executed by at least one processor, cause the at least one processor to: input an image to a vision transformer comprising a plurality of encoders that correspond to at least one fixed encoder and a plurality of adaptive encoders; process the image via the at least one fixed encoder to obtain image representations; determine one or more of multi-head self-attention (MSA) layers and multilayer perceptron (MLP) layers of the plurality of adaptive encoders to drop, by inputting the image representations to a policy network configured to determine layer dropout actions for the plurality of adaptive encoders; and obtain a class of the input image using remaining layers of the plurality of adaptive encoders other than the dropped one or more layers.

The policy network may be trained using a reward function that increases a reward in direct proportion to a number of the dropped one or more layers and image classification prediction accuracy of the vision transformer.

BRIEF DESCRIPTION OF THE DRAWINGS

The above and other aspects, features, and advantages of embodiments of the disclosure will be more apparent from the following description taken in conjunction with the accompanying drawings, in which.

DETAILED DESCRIPTION

Figure 1:
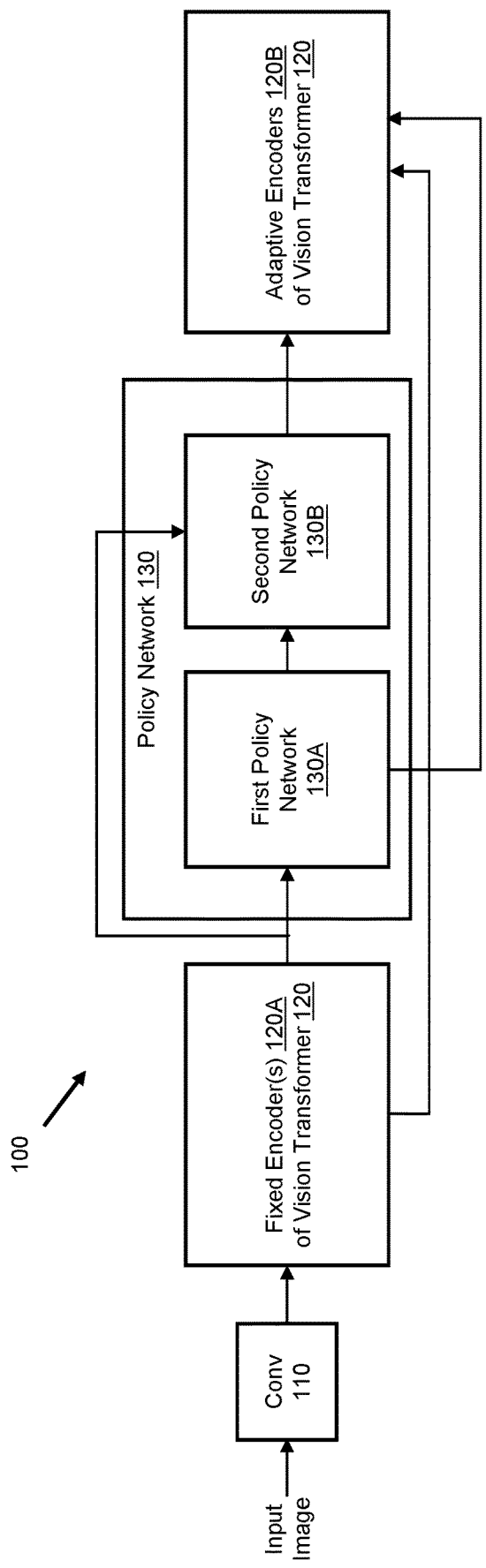
FIG. 1 is a block diagram illustrating an apparatus for performing image processing using one or more neural networks, according to embodiments.

Example embodiments are described in greater detail below with reference to the accompanying drawings.

In the following description, like drawing reference numerals are used for like elements, even in different drawings. The matters defined in the description, such as detailed construction and elements, are provided to assist in a comprehensive understanding of the example embodiments. However, it is apparent that the example embodiments can be practiced without those specifically defined matters. Also, well-known functions or constructions are not described in detail since they would obscure the description with unnecessary detail.

Expressions such as "at least one of," when preceding a list of elements, modify the entire list of elements and do not modify the individual elements of the list. For example, the expression, "at least one of a, b, and c," should be understood as including only a, only b, only c, both a and b, both a and c, both b and c, all of a, b, and c, or any variations of the aforementioned examples.

While such terms as "first," "second," etc., may be used to describe various elements, such elements must not be limited to the above terms. The above terms may be used only to distinguish one element from another.

A system according to embodiments of the present disclosure provides an apparatus for processing images using a vision transformer and a policy network configured to determine which layers of the vision transformer are to be dropped to reduce the runtime complexity while minimizing the accuracy loss of the vision transformer.

A vision transformer may be constituted with multiple repetitive homogeneous encoders, each of which contains a multi-headed self-attention (MSA) layer and a multilayer perception (MLP) layer. The policy network may instruct the vision transformer to drop the whole MSA layer and/or the MLP layer in any encoder, and the vision transformer may process an input image without any further modification. The structure of the vision transformer may allow the vision transformer to run an adaptive number of MSA layers and MLP layers conditionally on the input image without major loss in accuracy.

The policy network according to embodiments may be trained to learn what layers are relatively more important and what layers are relatively less important to drop relatively less important layers, in order to achieve the objectives of reducing the processing time, and maintaining the prediction accuracy of the vision transformer.

In order to achieve the objectives, the policy network may be trained using reinforcement learning with a dual reward system that takes into account the number of sampled MSA and MLP layers, and the prediction accuracy of the vision transformer. Through the training, the policy network learns to sample MSA and MLP layers that are critical for high accuracy. In an inference phase, the policy network processes an input image to output identifications of MSA and MLP layers to be dropped in the vision transformer.

FIG. 1 is a block diagram illustrating an apparatus for performing image processing using one or more neural networks, according to embodiments.

The apparatus 100 and any portion of the apparatus 100 may be included or implemented in a client device and/or a server device. The client device may include any type of electronic device, for example, a smartphone, a laptop computer, a personal computer (PC), a smart television and the like.

As shown in FIG. 1, the apparatus 100 includes a convolutional neural network 110, a vision transformer 120, and a policy network 130.

The convolutional neural network 110 may include one or more convolutional layers and one or more fully connected layers to extract image embeddings from an input image.

The vision transformer 120 may include a plurality of encoders to process the image embeddings and thereby to identify a class (e.g., a bird, a tiger, etc.) of the input image. The vision transformer 120 takes an image or embeddings of the image as input, and outputs representations of the image. The representations of the image may be fed to a MLP head (e.g., a linear layer) to obtain a class of the image. The MLP head may be part of the vision transformer 120, or may be provided separately from the vision transformer 120.

The vision transformer 120 may be constituted with multiple repetitive homogeneous encoder blocks, wherein each of the plurality of encoders may have the same or substantially the same structure. Among the plurality of encoders, at least one encoder may be operated as a fixed encoder 120A in which all the layers included in the fixed encoder 120A are used without being dropped out. For example, only the first encoder may operate as the fixed encoder 120A in an embodiment, or alternatively, the first two or three encoders may operate as the fixed encoders 120A in another embodiment.

The fixed encoder 120A may be expressed as follows:

$$z_1 = f_{t_1}(x; \theta_{t_1}) \quad (1)$$

wherein $f_{t_1}$ represents a function of the fixed encoder 120A, x represents an input image or image embeddings of the input image that are input to the fixed encoder 120A, $\theta_{t_1}$ represents parameters of $f_{t_1}$, and $z_1$ represents a feature vector or representations of the input image. In an embodiment, all the MSA and MLP layers included the fixed encoder(s) 120A may be used since no dropout is applied to the fixed encoder(s) 120A.

The remaining encoders other than the fixed encoder 120A may operate as adaptive encoders 120B to which dropout may be applied to drop or skip one or more layers of the adaptive encoders 120B according to characteristics of the input image. When there are an N number of encoders in the vision transformer 120, the first M number of encoders may be set as fixed encoders 120A, and the remaining (N−M) encoders may be set as the adaptive encoders 120B.

The adaptive encoders 120B may be expressed as follows:

$$a_3 = f_{t_2}(z_1 | a_1, a_2; \theta_{t_2}) \quad (2)$$

wherein $f_{t_2}$ represents a function of the adaptive encoders 120B, $z_1$ indicates the representations of the input image that are output from the fixed encoder 120A, $a_1$ and $a_2$ represent dropout actions for MSA and MLP layers that are determined by the policy network 130, $\theta_{t_2}$ represents parameters of $f_{t_2}$, and $a_3$ represents an image classification result after skipping certain MSA and MLP layers according to the dropout actions $a_1$ and $a_2$. The adaptive encoders 120B learn parameters $\theta_{t_2}$ to classify the input image x, given the dropout actions $a_1$ and $a_2$.

The policy network 130 may determine whether and which multi-head self-attention (MSA) layers and multi-layer perception (MLP) layers of the adaptive encoders 120B are to be dropped, to reduce the runtime complexity and computational resources while maintaining the accuracy of the vision transformer 120.

The policy network 130 may include a first policy network 130A configured to determine MSA layers to be dropped out, and a second policy network 130B configured to determine MLP layers to be dropped out.

The policy network 130 may receive the representations of the input image from the fixed encoder 120A, as input, and may output identifications of MSA layers and MLP layers to be dropped.

Specifically, the first policy network 130A may receive the representations of the input image, and may dynamically determine which (if any) MSA layers are be dropped among the MSA layers included in the adaptive encoders 120B of the vision transformer 120, based on the representations of the input image. The first policy network 130A may output dropout actions to be applied to each MSA layer of the vision transformer 130, wherein each dropout action indicates whether corresponding MSA layer is to be dropped or not.

The first policy network 130A may be expressed as follows:

$$\pi_{p_1} = (a_1 | z_1; \theta_{p_1}) \quad (3)$$

$\pi_{p_1}$ represents a function of the first policy network 130A, $z_1$ indicates the representations of the input image that are output from the fixed encoder 120A, $\theta_{p_1}$ represents parameters of $\pi_{p_1}$, and $a_1$ represents dropout actions to be applied to MSA layers, wherein $a_1 \in \{0, 1\}^M$ and M represents a total number of MSA layers. For example, $a_1$ is set to 0 when the first policy network 130A decides to drop an MSA layer, and $a_1$ is set to 1 when the first policy network 130A decides to use the MSA layer in processing the input image, but the manner of setting the values of $a_1$ is not limited thereto. The first policy network 130A learns parameters $\theta_{p_1}$ to set up and optimize the MSA layer dropping policy $\pi_{p_1}$.

The output (e.g., $a_1 \in \{0, 1\}^M$) of the first policy network 130A and the output (e.g., $z_1$) of the fixed encoder 120A may be fed into the second policy network 130B as input. The second policy network 130B may determine which (if any) MLP layers are to be dropped among the MLP layers included in the adaptive encoders 120B of the vision transformer 120. The second policy network 130B may output dropout actions to be applied to each MLP layer of the vision transformer 130, wherein each dropout action indicates whether corresponding MLP layer is to be dropped or not.

The second policy network 130B may be expressed as follows:

$$\pi_{p_2} = (a_2 | z_1, a_1; \theta_{p_2}) \quad (4)$$

$\pi_{p_2}$ represents a function of the second policy network 130B, $z_1$ indicates the representations of the input image that are output from the fixed encoder 120A, $\theta_{p_2}$ represents parameters of $\pi_{p_2}$, $a_1$ represents dropout actions to be applied to MSA layers, and $a_2$ represents dropout actions to be applied to MLP layers, wherein $a_2 \in \{0, 1\}^M$ and M represents a total number of MSA layers. For example, $a_2$ is set to 0 when the second policy network 130B decides to drop an MLP layer, and $a_2$ is set to 1 when the second policy network 130B decides to use the MLP layer in processing the input image, but the manner of setting the values of $a_2$ is not limited thereto. The second policy network 130B learns parameters $\theta_{p_2}$ to set up and optimize the MLP layer dropping policy $\pi_{p_2}$.

The vision transformer 120 may drop MSA layers and MLP layers according to dropout actions output from the first policy network 130A and the second policy network 130B, and may perform image classification on the input image while skipping the MSA layers and MLP layers as determined by the first policy network 130A and the second policy network 130B.

The vision transformer 120 may output final representations of the input image through the last encoder of the vision transformer 120. The representations of the input image may be processed through an MLP head to identify a class (e.g., a bird, a tiger, etc.) of the input image.

The vision transformer 120, the first policy network 130A, and the second policy network 130B may include hyperparameters $\theta_t$, $\theta_{p1}$, and $\theta_{p2}$, respectively, which are optimized via a training process. The training process according to an embodiment may use a reinforcement learning algorithm that provides a dual reward that encourages the vision transformer 120 to drop as many MSA and MLP layers as possible and to minimize an image classification loss. The first policy network 130A and the second policy network 130B may be jointly trained at a first step, and then the first policy network 130A, the second policy network 130B, and the vision transformer 120 may be jointly trained at a second step for fine tuning.

After the training of the vision transformer 120 and the policy network 130 is complete, an inference process is performed using the trained policy and the trained vision transformer. At runtime, the trained first policy network 130A is used to determine which, if any, MSA layers are to be dropped given the specific input image, and the trained second policy network 130B is used to determine which, if any, MLP layers are to be dropped in the adaptive encoders 120B of the vision transformer 120. The trained vision transformer 120 is used at runtime to classify the input image and performs image classification by skipping the MSA and MLP layers that are dynamically determined by the policies of the first policy network 130A and the second policy network 130B. The vision transformers 120 uses all the MSA and MLP layers in the fixed encoders 120A, and uses only the sampled MSA and MLP layers in the adaptive encoders 120B in processing the input image.

Figure 2:
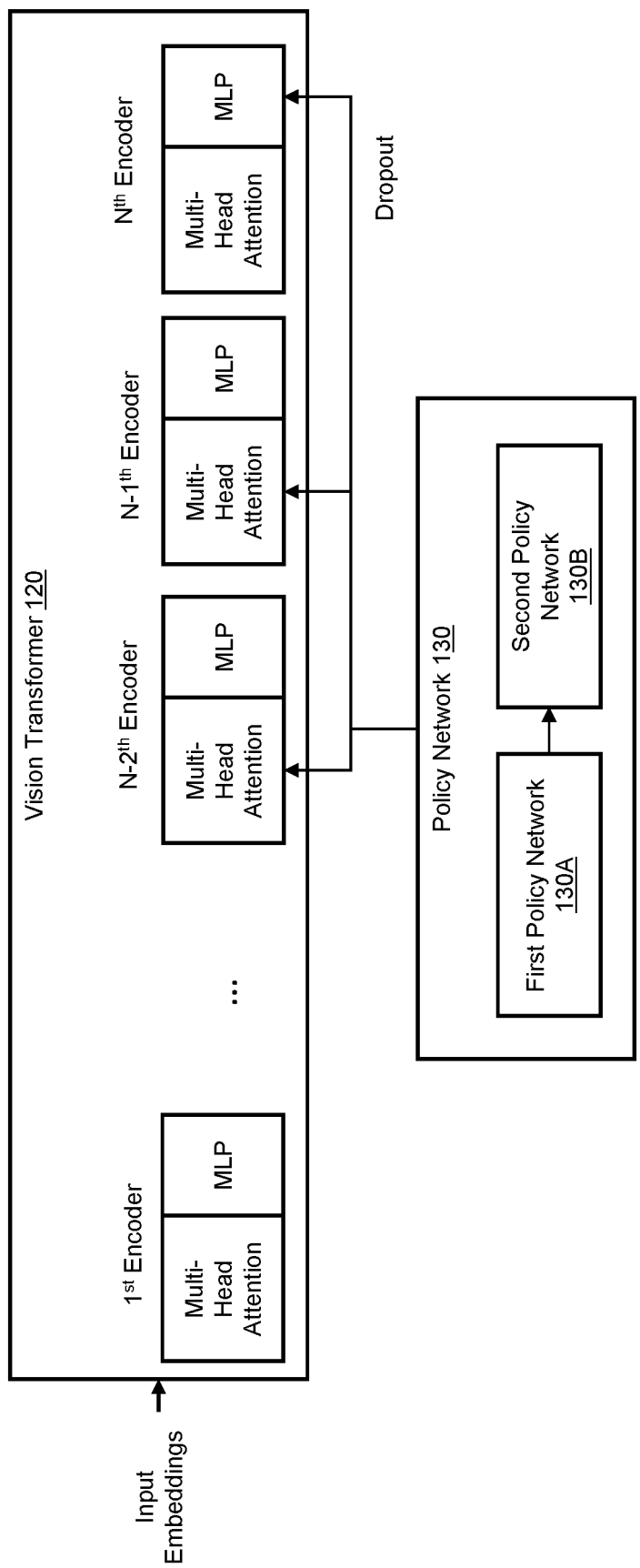
FIG. 2 is a block diagram illustrating an example of dropping one or more layers in a vision transformer using a policy network, according to embodiments.

FIG. 2 is a block diagram illustrating an example of dropping one or more layers in a vision transformer using a policy network, according to embodiments.

With reference to FIG. 2, it is assumed that the vision transformer 120 includes a N number of encoders, and the first encoder is set as a fixed encoder which is not affected by layer dropout decisions of the policy network 130. The remaining N−1 encoders are set as adaptive encoders whose MSA and MLP layers are skipped according to dropout decisions of the policy network 130. Although only the first encoder is set as a fixed encoder in FIG. 2, this is a mere example and more than one encoders (e.g., the first two encoders or the first three encoders) may be set as fixed encoders in which all the layers are used without being skipped.

Each of the N encoders has the same or substantially the same structure. In particular, each of the N encoders includes a multi-head self-attention layer that is followed by a multilayer perceptron layer.

In an example, it is assumed that N is 12, and among the total 12 encoders, one encoder is a fixed encoder and the remaining eleven (11) encoders are adaptive encoders. When the first policy network 130A outputs an action array $a_1 = \{1, 1, 1, 0, 1, 1, 1, 1, 1, 0, 0\}$, the MSA layers included in the $5^{th}$ encoder, the $11^{th}$ encoder, and the $12^{th}$ encoder are skipped in processing the input image. When the second policy network 130B outputs an action array $a_2 = \{1, 1, 1, 1, 0, 1, 0, 1, 1, 1, 0\}$, the MLP layers included in the $6^{th}$ encoder, the $8^{th}$ encoder, and the $12^{th}$ encoder are skipped in processing the input image. The action arrays $a_1$ and $a_2$ do not include actions for the MSA layer and the MLP layer included in the first encoder which operates as a fixed encoder.

Figure 3A:
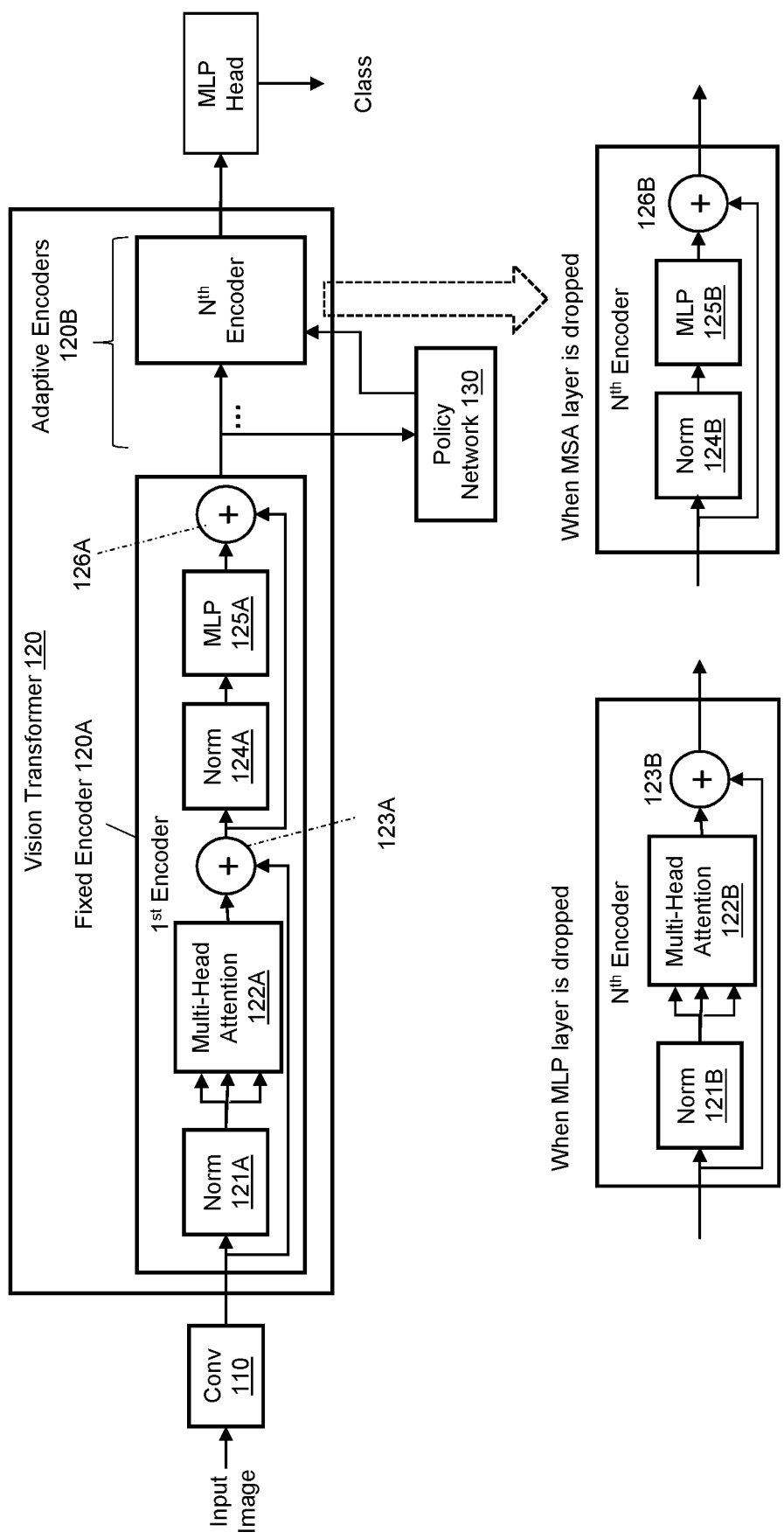
FIG. 3A is a diagram illustrating a structure of the vision transformer, according to embodiments.

FIG. 3A is a diagram illustrating a structure of the vision transformer 120, according to embodiments.

As shown in FIG. 3A, the vision transformer 120 may include a plurality of encoders. All of the encoders included in the vision transformer 120 may have the same components that perform substantially the same operations. All the layers included in a fixed encoder 120A may be used in processing an input image while some of the layers included in adaptive encoders 120B may be skipped according to dropout decisions of the policy network 130.

For example, the vision transformer 120 may include an N number of encoders, wherein the first M number encoders are fixed encoders 120A where all the layers are used without being skipped, and the following N−M number of encoders are adaptive encoders 120B where some of the layers included in the adaptive encoders 120B may be dropped through skip connections according to a decision of the policy network 130. M may be set to 1, 2, or 3. For example, when the vision transformer 120 includes 12 encoders, among which one encoder is a fixed encoder 120A, and the remaining 11 encoders operate as adaptive encoders 120B.

A fixed encoder 120A may include a first normalizer 121A, a multi-head self-attention (MSA) layer 122A, a first adder 123A, a second normalizer 124A, a multilayer perceptron (MLP) layer 125A, and a second adder 126A.

The first normalizer 121A normalizes image embeddings. The MSA layer 122A performs multi-head attention on the normalized image embeddings. The first adder 123A may add the output of the multi-head attention layer and the image embeddings. The output data of the first adder 123A is fed to the second normalizer 124A and then to the MLP layer 125A. The output of the MLP layer 125A is supplied to the second adder 126A, which adds the output of the first adder 123A and the output of the MLP layer 125A. The output of the fixed encoder 120A is supplied to the next encoder of the vision transformer 120, which may be another fixed encoder having the same components as the fixed encoder 120A, or the first adaptive encoder 120B.

In each adaptive encoder 120B, either one or both of the MSA layer and the MLP layer may be dropped via a skip connection, or none of the MSA layer and the MLP layer may be dropped, according to a decision of the policy network 130, unlike the fixed encoder(s) 120A where all the MSA layers and MLP layers are connected and used in processing the input image.

When dropout is applied to an MLP layer of the adaptive encoder 120B, the MLP layer may be skipped, and the adaptive encoder 120B is reconfigured with a normalization layer 121B, an MSA layer 122B, and an adder 123B.

When dropout is applied to an MSA layer of the adaptive encoder 120B, the MSA layer may be skipped, and the adaptive encoder 120B is reconfigured with a normalization layer 124B, an MLP layer 125B, and an adder 126B.

Figure 3B:
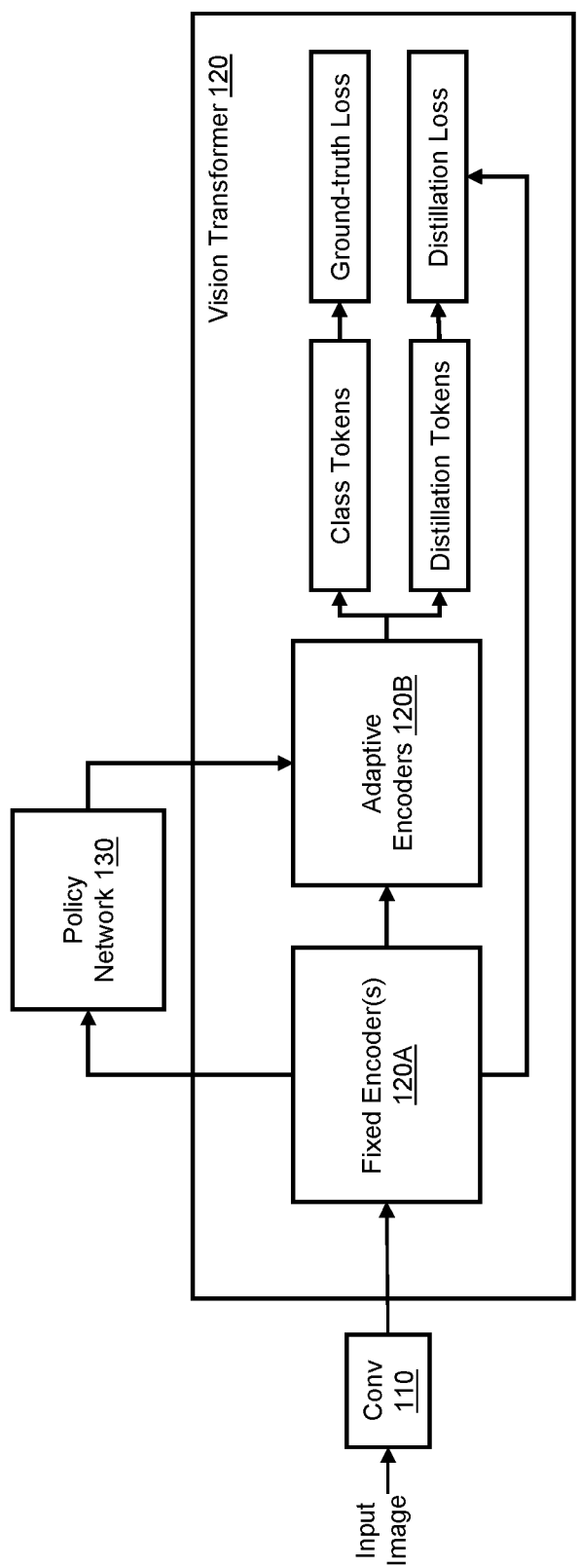
FIG. 3B is a diagram illustrating an example training process for training the vision transformer, according to embodiments.

FIG. 3B is a diagram illustrating an example training process for training the vision transformer 120. The vision transformer 120 according to embodiments may be also referred to as an adaptive vision transformer since the number of MSA and MLP layers of the vision transformer 120 that are used to process an input image may vary according to the complexity or property of the input image.

As shown in FIG. 3B, distillation tokens and class tokens are obtained from the last encoder (e.g., the last adaptive encoder 120B) of the vision transformer 120. A ground-truth loss is calculated based on the class tokens. A distillation loss is calculated based on the distillation tokens, and also based on image representations that are output from the fixed encoder 120A. The vision transformer 120 is trained by back propagating the ground-truth loss and the distillation loss.

At an inference stage, the vision transformer 120 may sum the class tokens and the distillation tokens to predict a class of an input image.

Figure 4:
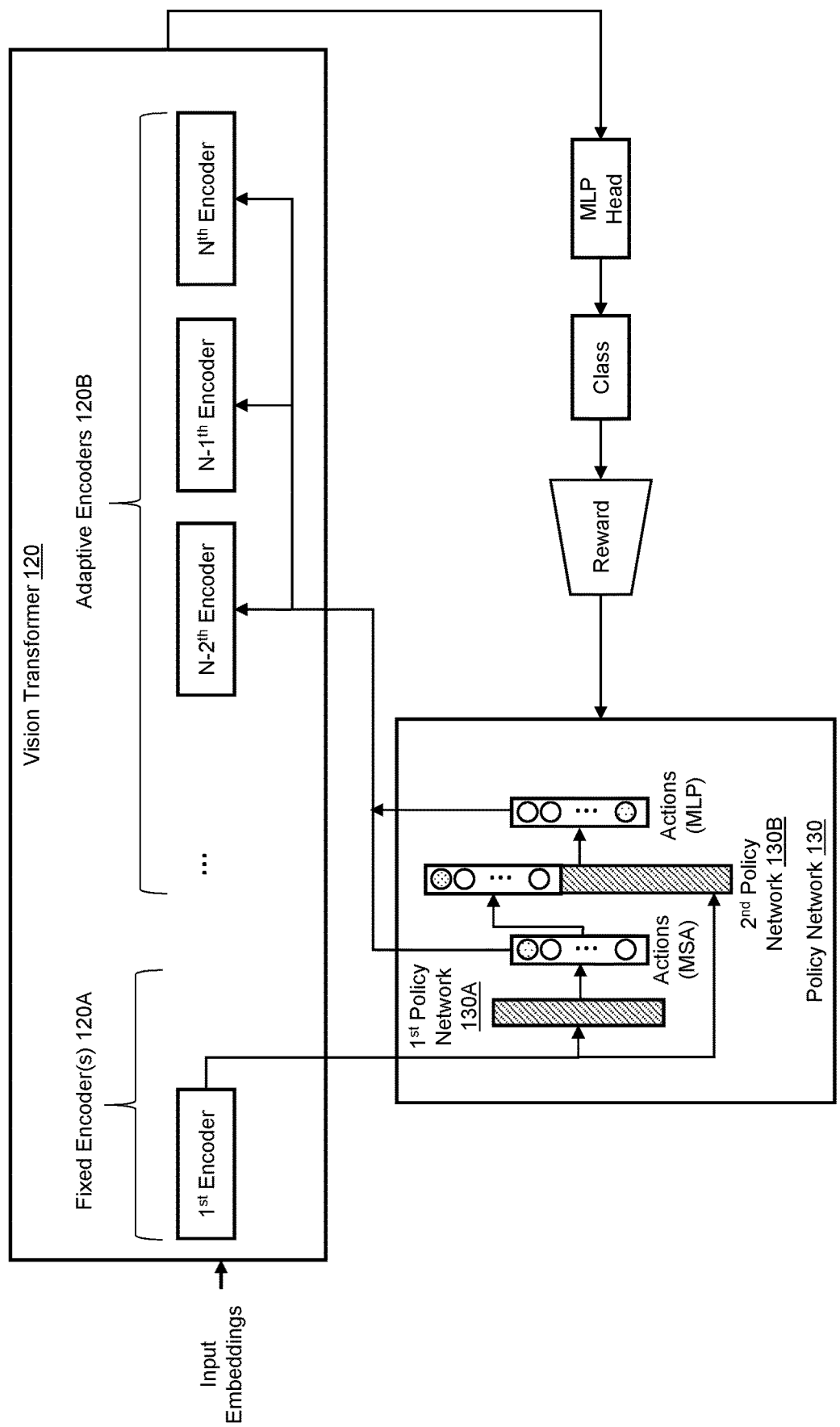
FIG. 4 is a diagram illustrating a structure of the policy network, according to embodiments.

FIG. 4 is a diagram illustrating a structure of a policy network 130, according to embodiments.

The policy network 130 may include a first policy network 130A configured to determine actions for fixed encoders 120A and a second policy network 130B configured to determine actions for adaptive encoders 120B.

Assuming there are a N number adaptive encoders 120B in the vision transformer 120, the first policy network 130A outputs a N number of discrete actions at once conditionally on an input image. For example, when there is one fixed encoder and eleven (11) adaptive encoders in the vision transformer, the first policy network 130A output 11 actions for 11 MSA layers that are included in the 11 adaptive encoders.

The actions that are output from the first policy network 130A are expressed as action likelihoods, and the action likelihood function of the first policy network 130A is defined using a multinomial distribution as follows:

$$\pi_{p_1}(a_1 \mid z_1, \theta_{p_1}) = \prod_{m=1}^{M} s_{p_1}^{a^m} \quad (5)$$

Where $\pi_{p_1}$ represents a dropout policy for MSA layers included in the adaptive encoders 120B, $a_1$ represents an action array for the MSA layers included in the adaptive encoders 120B, $z_1$ indicates image representations of an input image $x_1$ that are output from the fixed encoder 120A, $\theta_{p_1}$ are hyperparameters of the first policy network 130A which are optimized by a training process, M represents the number of the adaptive encoders 120B, and $s_{p_1}$ represents a prediction vector formulated as:

$$s_{p_1} = f_{p_1}(z_1; \theta_{p_1}) \quad (6)$$

The first policy network 130A may use a single dense layer that applies a sigmoid function on the final layer to return probability values for an action array $a_1$ for MSA layers, $s_{p_1} \in [0, 1]$. The number of actions included in the action array $a_1$ may correspond to the number of the adaptive encoders 120B included in the vision transformer 120.

The probabilities of the first policy network 130A are bounded as:

$$s_{p_1} = \lambda s_{p_1} + (1-\lambda)(1-s_{p_1}) \quad (7)$$

where $\lambda \in [0, 1]$.

The image representations $z_1$ and the action array $a_1$ are concatenated and then are input to the second policy network 130B. The second policy network 130B may include a dense layer $f_{p_2}$ operating on the image representations $z_1$ and the action array $a_1$. For example, the second policy network 130B may be formed as a single dense layer.

The action likelihood function of the second policy network 130B is defined using a multinomial distribution as follows:

$$\pi_{p_2}(a_2 \mid z_1, a_1, \theta_{p_2}) = \prod_{m=1}^{M} s_{p_2}^{a_2^m} \quad (8)$$

Where $\pi_{p_2}$ represents a dropout policy for MLP layers included in the adaptive encoders 120B, $a_1$ represents an action array for the MSA layers included in the adaptive encoders 120B, $a_2$ represents an action array for the MLP layers included in the adaptive encoders 120B, $\theta_{p_2}$ are hyperparameters of the second policy network 130B which are optimized by a training process, M represents the number of the adaptive encoders 120B, and $s_{p_2}$ represents a prediction vector formulated as:

$$s_{p_2} = f_{p_2}(z_1, a_1; \theta_{p_2}) \quad (9)$$

The second policy network 130B may use a sigmoid function to return probability values for the action array $a_2$ for MLP layers.

The probabilities of the second policy network 130B are bounded for exploration-exploitation trade-off as:

$$s_{p_2} = \lambda s_{p_2} + (1-\lambda)(1-s_{p_2}) \quad (10)$$

where $\lambda \in [0, 1]$.

Given the action arrays $a_1$ and $a_2$, the vision transformer 120 processes the input image x to obtain a classification result $a_3$ of the input image x as follows:

$$a_3 = f_t(x \mid a_1, a_2; \theta_t) \quad (11)$$

Where $f_t$ is a function of the vision transformer 120, and $a_3$ are hyperparameters of the vision transformer 120 which are to be optimized by a training process.

The policy network 130 is optimized based on a reward function that takes the following at least two parameters into account: (1) a number of dropped MSA or MLP layers; and (2) accuracy of the vision transformer 120. The reward function R is expressed as follows:

$$R = \left(1 - \frac{\|a_1\|_1}{M}\right) + \left(1 - \frac{\|a_2\|_2}{M}\right) + \alpha * Acc(f_t(x \mid a_1, a_2), y) \quad (12)$$

Where M represents the number of the adaptive encoders 120B and y represents a ground-truth class of the input image.

The first component of the reward function is inversely proportional to the number of sampled MSA layers, and is directly proportional to the number of skipped MSA layers. The first component of the reward function is inversely proportional to the number of sampled MLP layers, and is directly proportional to the number of skipped MLP layers. The third component assigns a higher reward to the actions that lead to a high accuracy in classifying the input image.

The parameters $\theta_{p_1}$ and $\theta_{p_2}$ of the first and second policy networks 130A and 130B may be optimized using a policy gradient method, in which policy distributions are multiplied by the reward function R with respect to the parameters $\theta_{p_1}$ and $\theta_{p_2}$ as follows:

$$\nabla_{\theta_{p_1}, \theta_{p_2}} J = \quad (13)$$
$$E[R(a_1, a_3, y)\nabla_{\theta_{p_1}} \log \pi_{p_1}(a_1|x_1)] E[R(a_2, a_3, y)\nabla_{\theta_{p_2}} \log \pi_{p_2}(a_2|a_1, z_1)]$$

Where J represents an objective of the policy network 130 defined as maximizing the reward R as follows:

$$\max_{\theta_{p_1}, \theta_{p_2}, \theta_t} J(\theta_{p_1}, \theta_{p_2}, \theta_t) = E_{p_1}[R(a_1, a_3, y)] + E_{p_2}[R(a_2, a_3, y)] \quad (14)$$

Wherein the reward R depends on $a_1$, $a_2$, $a_3$, and y. The reward R penalizes the policy network 130 for selecting a large number of MSA and MLP layers, and highly rewards actions that will lead to a low classification loss, given the ground-truth image class y.

Figure 5:
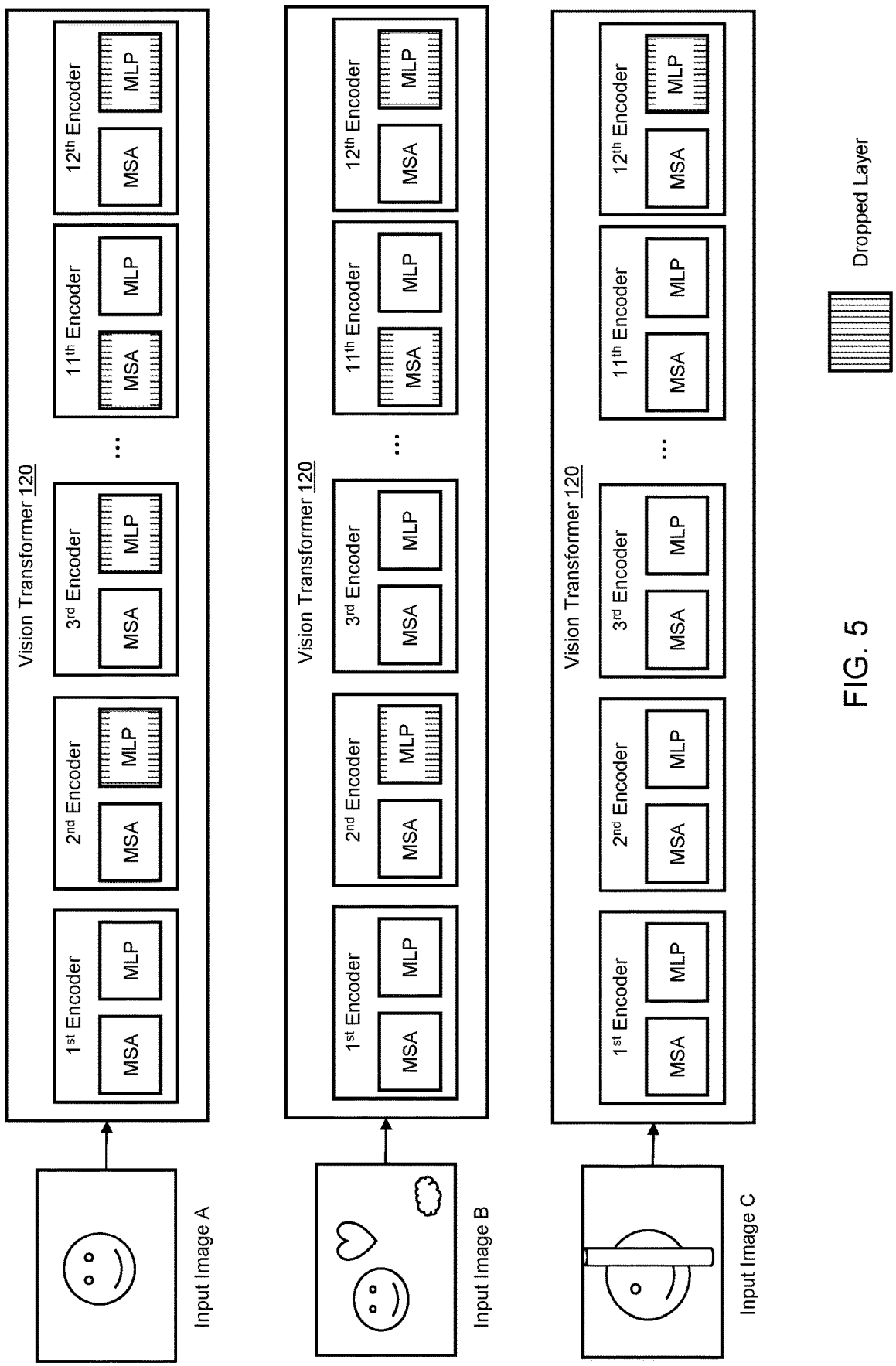
FIG. 5 is a diagram illustrating examples of dropping one or more layers in the vision transformer based on characteristics of input images, according to embodiments

FIG. 5 is a diagram illustrating examples of dropping one or more layers in the vision transformer based on characteristics of input images, according to embodiments.

The vision transformer 120 that is trained according to embodiments of the present disclosure may process input images using a variable number of MSA and MLP layers according to characteristics (e.g., complexity) of the input images.

For example, an input image A includes a large object of interest without any other objects, an input image B includes a small object of interest and some other objects, and an input image C includes an object of interest that is partially occluded by another object.

In an embodiment, when the vision transformer 120 processes the input image A, the vision transformer 120 may drop one MSA layer and three MLP layers. When the vision transformer 120 processes the input image B, the vision transformer 120 may drop one MSA layer and two MLP layers. When the vision transformer 120 processes the input image C, the vision transformer 120 may drop one MLP layer.

The vision transformer 120 may use a smaller number of MSA and MLP layers in processing relatively easy and simple images (e.g., the input images A and B), compared with relatively challenging images (e.g., the input image C). Accordingly, the vision transformer 120 may run a smaller number of MSA and MLP layers on average and therefore may increase runtime efficiency while preserving the accuracy of the fully operated vision transformer 120.

Figure 6:
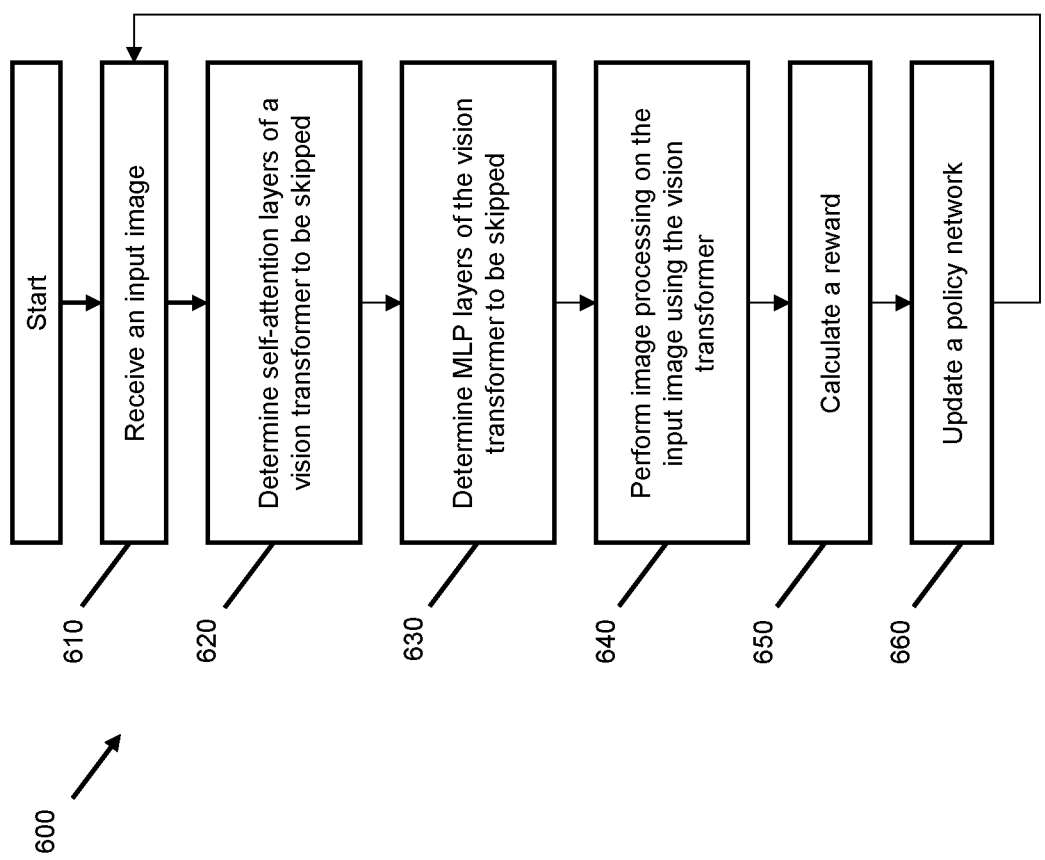
FIG. 6 is a flowchart illustrating a method of training the policy network and the vision transformer, according to embodiments.

FIG. 6 is a flowchart illustrating a method 600 of training the vision transformer 120 and the policy network 130, according to embodiments.

The policy network 130 is trained via a reinforcement learning algorithm using a dual reward that encourages the vision transformer 120 to skip a large number of layers and achieve a low prediction loss.

The method 600 includes feeding an input image to the vision transformer 120 in operation 610. Image embeddings may be extracted from the input image using a convolutional neural network, and the image embeddings may be supplied to the vision transformer 120 as representations of the input image.

The method 600 includes determining multi-head self-attention (MSA) layers of the vision transformer 120 to be skipped, using a first policy network 120A, in operation 620.

The method 600 includes determining multilayer perceptron (MLP) layers of the vision transformer 120 to be skipped, using a second policy network 120B, in operation 630.

The vision transformer 120 may be reconfigured to drop the MSA layers and the MLP layers via skip connections as determined in operations 620 and 630.

The method 600 includes performing image processing on the input image using the remaining MSA and MLP layers of the vision transformer 120, to predict a class of the input image, in operation 640.

The method 600 includes calculating a reward based on the number of dropped MSA and MLP layers, and accuracy of the predicted class of the input image, in operation 650. The reward may increase as the number of dropped MSA and MLP layers increases and as the accuracy increases. The vision transformer 120, the first policy network 130A, and the second policy network 130B may be jointly trained, for example using the reward function according to equation (12).

According to embodiments of the disclosure, the first policy network 130A and the second policy network 130B may be trained at a first stage, and in turn, the first policy network 130A, the second policy network 130B, and the vision transformer 120 may be jointly trained for fine tuning, at a second stage, for example according to equation (12). At the first stage, the first policy network 130A and the second policy network 130B may be trained using the following reward functions $R_1$ and $R_2$:

$$R1 = \left(1 - \frac{\|a_1\|_1}{M}\right) + \alpha * Acc(f_t(x \mid a_1, \theta_t), y) \quad (15)$$

$$R2 = \left(1 - \frac{\|a_2\|_1}{M}\right) + \alpha * Acc(f_t(x \mid a_2, \theta_t), y) \quad (16)$$

where $\alpha$ is a coefficient for adjusting the trade-off between the prediction accuracy and the number of sampled layers.

The first policy network 130A and the second policy network 130B are trained using a reinforcement learning algorithm that balances the action of skipping layers in the vision transformer during runtime and the evaluation result of the image classification accuracy in performing a computer-vision task.

The method 600 includes updating the policy network 130 to learn a new dropout policy based on the calculated reward, in operation 660.

After the training of the vision transformer 120 and the policy network 130 is complete, an inference process is performed using the trained policies and vision transformer. At runtime, the trained first policy network 130A is used to determine which, if any, MSA layers are to be dropped given the specific input image, and the trained second policy network 130B is used to determine which, if any, MLP layers are to be dropped in the adaptive encoders 120B of the vision transformer 120. The trained vision transformer 120 is used at runtime to classify the input image and performs classification by skipping the MSA and MLP layers that are dynamically determined by the policies of the first policy network 130A and the second policy network 130B. The vision transformers 120 uses all the MSA and MLP layers in the fixed encoders 120A, and uses only the sampled MSA and MLP layers in the adaptive encoders 120B in processing the input image. The inference process is described in further detail with reference of FIG. 7 below.

Figure 7:
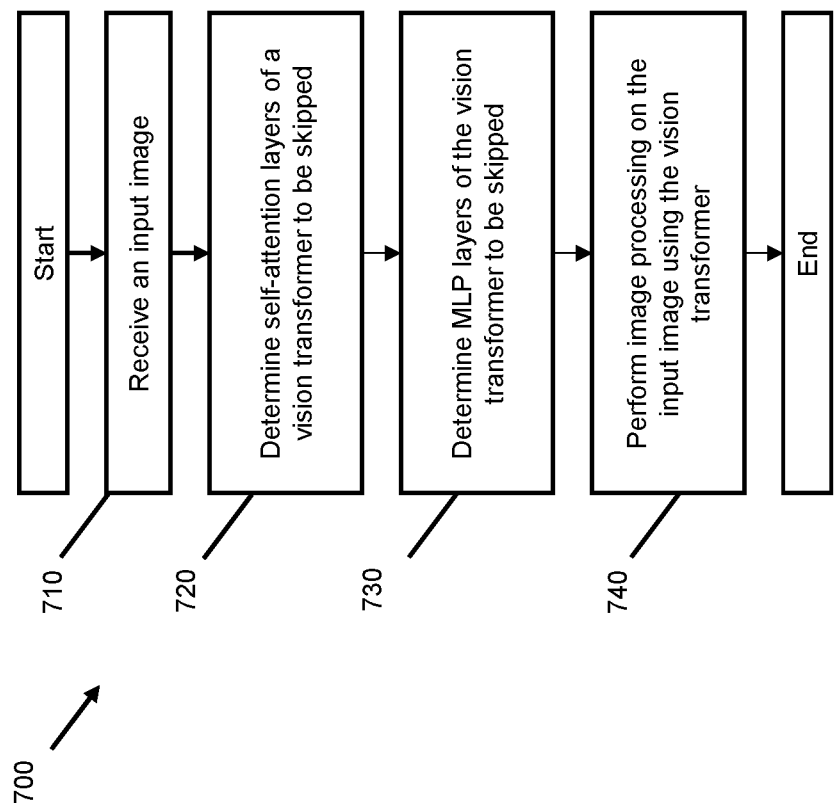
FIG. 7 is a flowchart illustrating a method of performing image processing using one or more neural networks in an inference phase, according to embodiments.

FIG. 7 is a flowchart illustrating a method 700 of performing image processing using one or more neural networks in an inference phase, according to embodiments.

The method 700 includes feeding an input image to a vision transformer 120, in operation 710.

The method 700 includes determining multi-head self-attention (MSA) layers of the vision transformer 120 to be skipped, using a first policy network 120A, in operation 720.

The method 700 includes determining multilayer perceptron (MLP) layers of the vision transformer 120 to be skipped, using a second policy network 120B, in operation 730.

The vision transformer 120 may be reconfigured to drop the MSA layers and the MLP layers via skip connections as determined in operations 720 and 730.

The method 700 includes performing image processing on the input image using the remaining MSA and MLP layers of the vision transformer 120, to predict a class of the input image, in operation 740.

Figure 8:
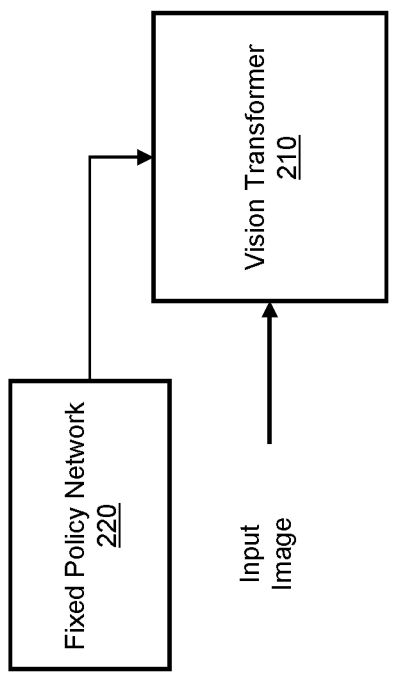
FIG. 8 is a block diagram illustrating an apparatus for performing image processing using a fixed policy network according to other embodiments.

FIG. 8 is a block diagram illustrating an apparatus 200 for performing image processing according to other embodiments.

As shown in FIG. 8, the apparatus 200 may include a vision transformer 210 and a fixed policy network 220.

The vision transformer 210 may have the same or substantially the same structure as the vision transformer 120.

The fixed policy network 220 may generate dropout actions according to one of a plurality of layer dropout policies that are stored in the apparatus 200. The plurality of layer dropout policies may be set to drop a first N number of layers based on an experimental result indicating that the closer the MSA and MLP layers are to the early stage of the vision transformer 210, the more the MSA and MLP layers are important in processing an image. For example, the fixed policy network 220 may apply one of the plurality of layer dropout policies according to a user input or a preset criterion, based on Table 1 below.

TABLE 1

|  | Number of MSA Layers To Drop | Number of MLP Layers To Drop |
| --- | --- | --- |
| Policy 1 | First 5 MSA layers | First 5 MPL layers |
| Policy 2 | First 5 MSA layers | First 3 MPL layers |
| Policy 3 | First 3 MSA layers | First 3 MPL layers |
| Policy 4 | First 1 MSA layers | First 2 MPL layers |
| Policy 5 | None | None |

Figure 9:
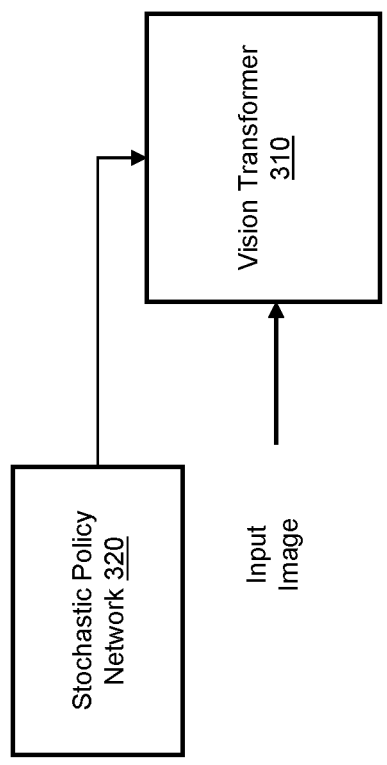
FIG. 9 is a block diagram illustrating an apparatus for performing image processing using a stochastic policy network according to other embodiments.

FIG. 9 is a block diagram illustrating an apparatus 300 for performing image processing according to other embodiments.

As shown in FIG. 9, the apparatus 300 may include a vision transformer 310 and a stochastic policy network 320.

The vision transformer 310 may have the same or substantially the same structure as the vision transformer 120.

The stochastic policy network 320 may operate according to a stochastic policy function that assigns a probability of survival to each MSA layer and each MLP layer in the vision transformer 310. In particular, the stochastic policy function assigns a higher survival probability to MSA and MPL layers at relatively earlier processing stages than the rest of MSA and MPL layers in the vision transformer 310, and assigns a lower survival probability to MSA and MPL layers at relatively later processing stages than the rest of MSA and MPL layers in the vision transformer 310.

Figure 10:
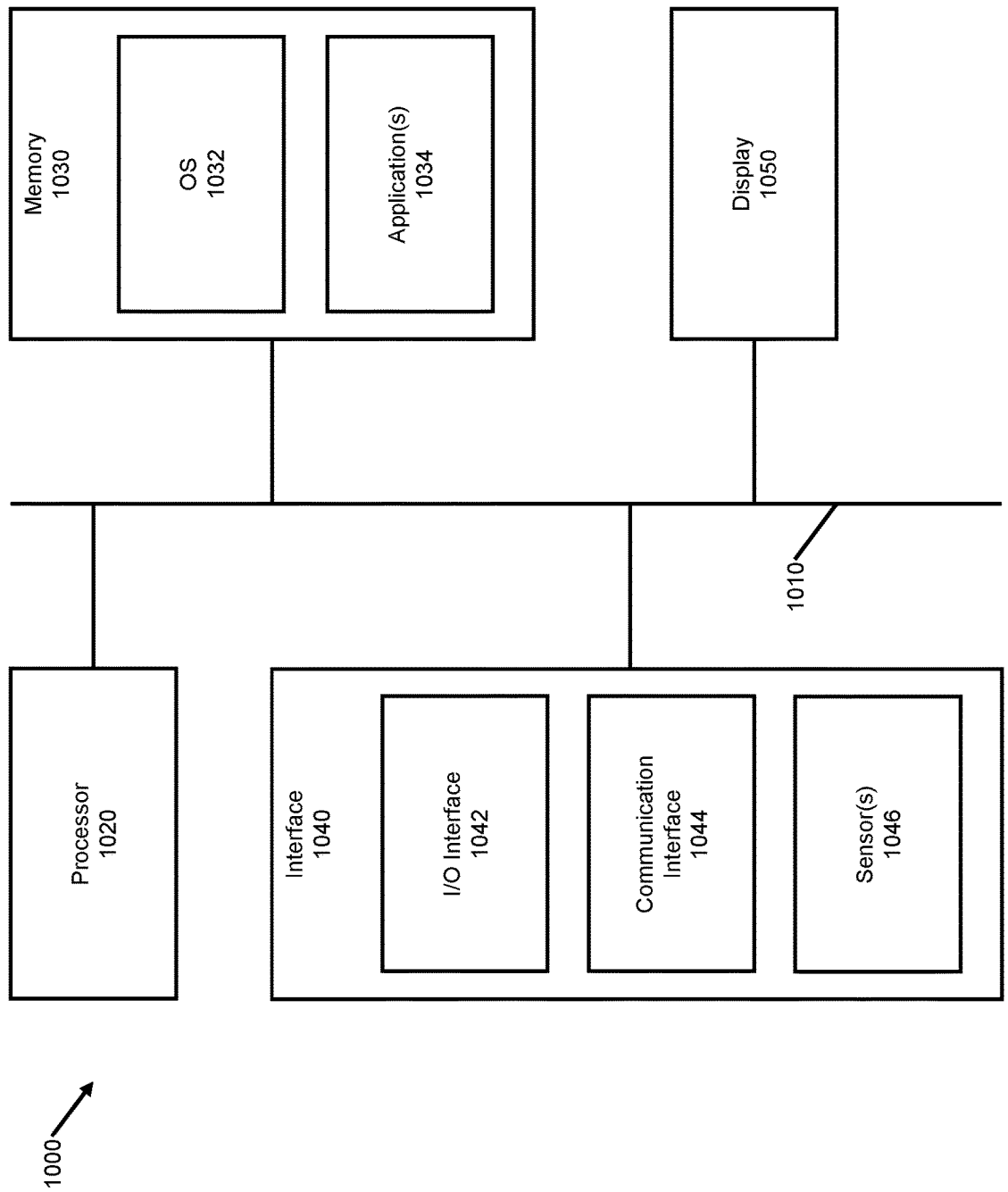
FIG. 10 is a block diagram of an electronic device in which the apparatus of FIG. 1 is implemented, according to embodiments.

FIG. 10 is a block diagram of an electronic device 100 in which the apparatus of FIG. 1 is implemented, according to embodiments.

FIG. 10 is for illustration only, and other embodiments of the electronic device 1000 could be used without departing from the scope of this disclosure.

The electronic device 1000 includes a bus 1010, a processor 1020, a memory 1030, an interface 1040, and a display 1050.

The bus 1010 includes a circuit for connecting the components 1020 to 1050 with one another. The bus 1010 functions as a communication system for transferring data between the components 1020 to 1050 or between electronic devices.

The processor 1020 includes one or more of a central processing unit (CPU), a graphics processor unit (GPU), an accelerated processing unit (APU), a many integrated core (MIC), a field-programmable gate array (FPGA), or a digital signal processor (DSP). The processor 1020 is able to perform control of any one or any combination of the other components of the electronic device 1000, and/or perform an operation or data processing relating to communication. For example, the processor 1020 performs the operations of the vision transformer 120, 210, or 310, and the policy network 130, 220, or 320. The processor 1020 executes one or more programs stored in the memory 1030.

The memory 1030 may include a volatile and/or non-volatile memory. The memory 1030 stores information, such as one or more of commands, data, programs (one or more instructions), applications 1034, etc., which are related to at least one other component of the electronic device 1000 and for driving and controlling the electronic device 1000. For example, commands and/or data may formulate an operating system (OS) 1032. Information stored in the memory 1030 may be executed by the processor 1020.

The applications 1034 include the above-discussed embodiments. These functions can be performed by a single application or by multiple applications that each carry out one or more of these functions. For example, the applications 1034 may include an artificial intelligence (AI) model for performing the operations of the vision transformer 120, 210, or 310, and the policy network 130, 220, or 320.

The display 1050 includes, for example, a liquid crystal display (LCD), a light emitting diode (LED) display, an organic light emitting diode (OLED) display, a quantum-dot light emitting diode (QLED) display, a microelectromechanical systems (MEMS) display, or an electronic paper display. The display 1050 can also be a depth-aware display, such as a multi-focal display. The display 1050 is able to present, for example, various contents, such as text, images, videos, icons, and symbols.

The interface 1040 includes input/output (I/O) interface 1042, communication interface 1044, and/or one or more sensors 1046. The I/O interface 1042 serves as an interface that can, for example, transfer commands and/or data between a user and/or other external devices and other component(s) of the electronic device 1000.

The sensor(s) 1046 can meter a physical quantity or detect an activation state of the electronic device 1000 and convert metered or detected information into an electrical signal. For example, the sensor(s) 1046 can include one or more cameras or other imaging sensors for capturing images of scenes. The sensor(s) 1046 can also include any one or any combination of a microphone, a keyboard, a mouse, one or more buttons for touch input, a gyroscope or gyro sensor, an air pressure sensor, a magnetic sensor or magnetometer, an acceleration sensor or accelerometer, a grip sensor, a proximity sensor, a color sensor (such as a red green blue (RGB) sensor), a bio-physical sensor, a temperature sensor, a humidity sensor, an illumination sensor, an ultraviolet (UV) sensor, an electromyography (EMG) sensor, an electroencephalogram (EEG) sensor, an electrocardiogram (ECG) sensor, an infrared (IR) sensor, an ultrasound sensor, an iris sensor, and a fingerprint sensor. The sensor(s) 1046 can further include an inertial measurement unit. In addition, the sensor(s) 1046 can include a control circuit for controlling at least one of the sensors included herein. Any of these sensor(s) 1046 can be located within or coupled to the electronic device 1000. The sensors 1046 may be used to detect touch input, gesture input, and hovering input, using an electronic pen or a body portion of a user, etc.

Figure 11:
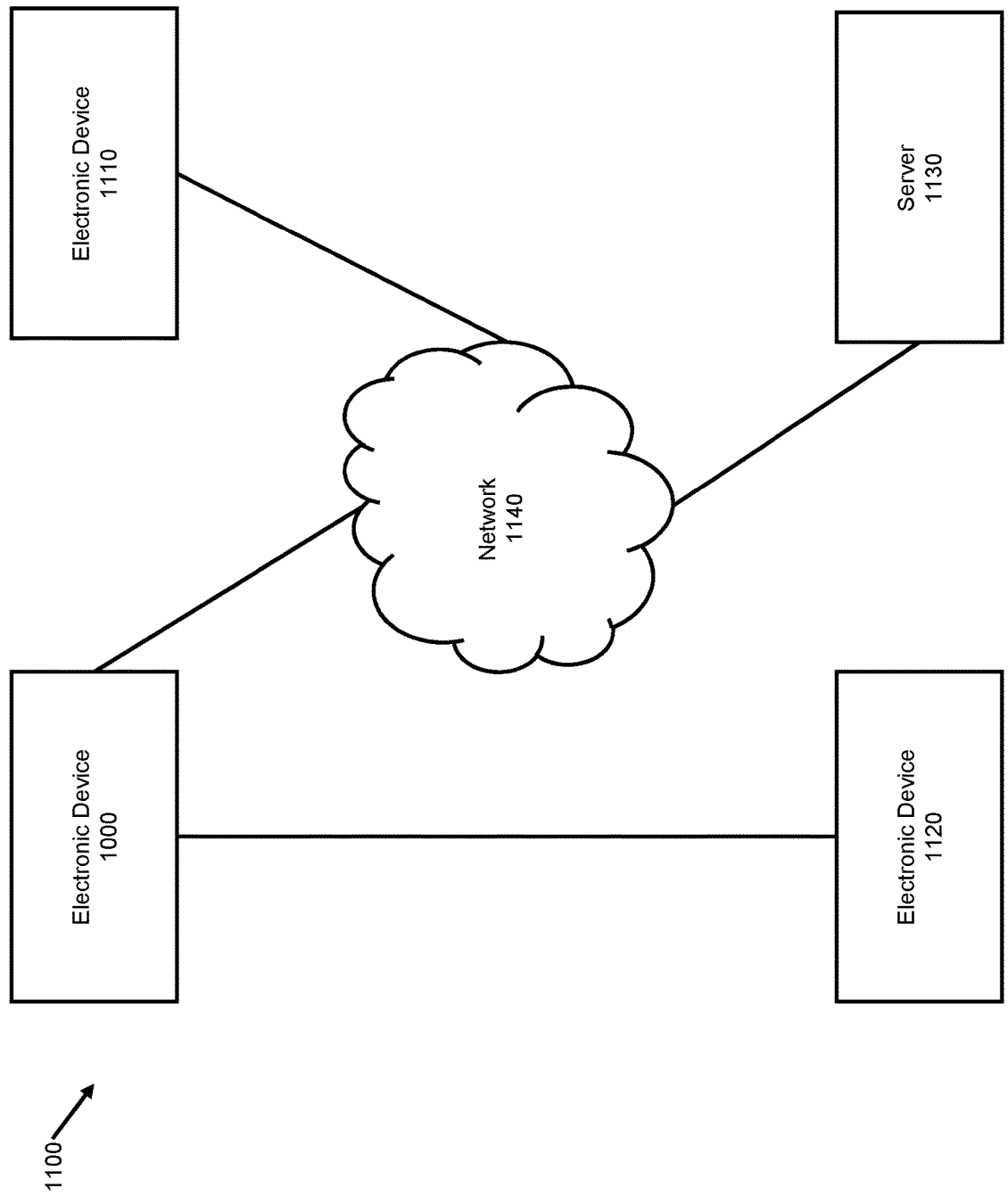
FIG. 11 is a diagram of a system in which the apparatus of FIG. 1 is implemented, according to embodiments.

The communication interface 1044, for example, is able to set up communication between the electronic device 1000 and an external electronic device, such as a first electronic device 1110, a second electronic device 1120, or a server 1130 as illustrated in FIG. 11. Referring to FIGS. 10 and 11, the communication interface 1044 can be connected with a network 1140 through wireless or wired communication architecture to communicate with the external electronic device. The communication interface 1044 can be a wired or wireless transceiver or any other component for transmitting and receiving signals.

FIG. 11 is a diagram of a system 1100 in which the apparatus 100 of FIG. 1 is implemented, according to embodiments.

The electronic device 1000 of FIG. 11 is connected with the first external electronic device 1110 and/or the second external electronic device 1120 through the network 1140. The electronic device 1000 can be a wearable device, an electronic device-mountable wearable device (such as an HMD), etc. When the electronic device 1000 is mounted in the electronic device 1120 (such as the HMD), the electronic device 1000 can communicate with electronic device 1120 through the communication interface 1044. The electronic device 1000 can be directly connected with the electronic device 1120 to communicate with the electronic device 1120 without involving a separate network. The electronic device 1000 can also be an augmented reality wearable device, such as eyeglasses, that include one or more cameras.

The first and second external electronic devices 1110 and 1120 and the server 1130 each can be a device of the same or a different type from the electronic device 1000. According to embodiments, the server 1130 includes a group of one or more servers. Also, according to embodiments, all or some of the operations executed on the electronic device 1000 can be executed on another or multiple other electronic devices, such as the electronic devices 1110 and 1120 and/or the server 1130). Further, according to embodiments, when the electronic device 1000 performs some function or service automatically or at a request, the electronic device 1000, instead of executing the function or service on its own or additionally, can request another device (such as the electronic devices 1110 and 1120 and/or the server 1130) to perform at least some functions associated therewith. The other electronic device (such as the electronic devices 1110 and 1120 and/or the server 1130) is able to execute the requested functions or additional functions and transfer a result of the execution to the electronic device 1000. The electronic device 1000 can provide a requested function or service by processing the received result as it is or additionally. To that end, a cloud computing, distributed computing, or client-server computing technique may be used, for example. While FIGS. 10 and 11 show that the electronic device 1000 includes the communication interface 1044 to communicate with the external electronic device 1110 and/or 1120 and/or the server 1130 via the network 1140, the electronic device 1000 may be independently operated without a separate communication function according to embodiments.

The server 1130 can include the same or similar components 1010-1050 as the electronic device 1000, or a suitable subset thereof. The server 1130 can support the drive of the electronic device 1000 by performing at least one of a plurality of operations or functions implemented on the electronic device 1000. For example, the server 1130 can include a processing module or processor that may support the processor 1020 implemented in the electronic device 1000.

The wireless communication is able to use any one or any combination of, for example, long term evolution (LTE), long term evolution-advanced (LTE-A), 5th generation wireless system (5G), millimeter-wave or 60 GHz wireless communication, Wireless USB, code division multiple access (CDMA), wideband code division multiple access (WCDMA), universal mobile telecommunication system (UMTS), wireless broadband (WiBro), and global system for mobile communication (GSM), as a cellular communication protocol. The wired connection can include, for example, any one or any combination of a universal serial bus (USB), a high definition multimedia interface (HDMI), a recommended standard 232 (RS-232), and a plain old telephone service (POTS). The network 1140 includes at least one communication network, such as a computer network (like a local area network (LAN) or wide area network (WAN)), the Internet, or a telephone network.

Although FIG. 11 illustrates one example of the system 1100 including the electronic device 1000, the two external electronic devices 1110 and 1120, and the server 1130, various changes may be made to FIG. 11. For example, the system 1100 could include any number of each component in any suitable arrangement. In general, computing and communication systems come in a wide variety of configurations, and FIG. 11 does not limit the scope of this disclosure to any particular configuration. Also, while FIG. 11 illustrates one operational environment in which various features disclosed in this patent document, can be used, these features could be used in any other suitable system.

The embodiments of the disclosure described above may be written as computer executable programs or instructions that may be stored in a medium.

The medium may continuously store the computer-executable programs or instructions, or temporarily store the computer-executable programs or instructions for execution or downloading. Also, the medium may be any one of various recording media or storage media in which a single piece or plurality of pieces of hardware are combined, and the medium is not limited to a medium directly connected to electronic device 1000, but may be distributed on a network. Examples of the medium include magnetic media, such as a hard disk, a floppy disk, and a magnetic tape, optical recording media, such as CD-ROM and DVD, magnetooptical media such as a floptical disk, and ROM, RAM, and a flash memory, which are configured to store program instructions. Other examples of the medium include recording media and storage media managed by application stores distributing applications or by websites, servers, and the like supplying or distributing other various types of software.

The above described method may be provided in a form of downloadable software. A computer program product may include a product (for example, a downloadable application) in a form of a software program electronically distributed through a manufacturer or an electronic market. For electronic distribution, at least a part of the software program may be stored in a storage medium or may be temporarily generated. In this case, the storage medium may be a server or a storage medium of server 1130.

A model related to the neural networks described above may be implemented via a software module. When the model is implemented via a software module (for example, a program module including instructions), the model may be stored in a computer-readable recording medium.

Also, the model may be a part of the apparatus 100 described above by being integrated in a form of a hardware chip. For example, the model may be manufactured in a form of a dedicated hardware chip for artificial intelligence, or may be manufactured as a part of an existing general-purpose processor (for example, a CPU or application processor) or a graphic-dedicated processor (for example a GPU).

Also, the model may be provided in a form of downloadable software. A computer program product may include a product (for example, a downloadable application) in a form of a software program electronically distributed through a manufacturer or an electronic market. For electronic distribution, at least a part of the software program may be stored in a storage medium or may be temporarily generated. In this case, the storage medium may be a server of the manufacturer or electronic market, or a storage medium of a relay server.

The adaptive vision transformer according to embodiments can be used for image classification tasks on mobile devices. Additionally, the adaptive vision transformer can be used for object detection as well as image segmentation and other computer vision tasks. The adaptive vision transformer can run with higher runtime efficiency and high accuracy. According to experiments conducted on the adaptive vision transformer in an embodiment and an existing vision transformer, the adaptive vision transformer has 25%-40% higher runtime efficiency (i.e., 25%-40% shorter latency) than the existing vision transformer. Further, the adaptive vision transformer may require a 25%-45% less amount of FLOPs per image than the existing vision transformer. Unlike the existing vision transformer, the adaptive vision transformer may process a less number of MPA and MLP layers for relatively easy scenarios (e.g., the input images A and B in FIG. 5) and a larger number of layers for relatively challenging scenarios (e.g., the input image C in FIG. 5). As a result, the adaptive vision transformer may improve runtime efficiency and reduce computational resources on average. For example, the adaptive vision transformer may use seven (7) MSA layers and six (6) MLP layers on average, while the existing vision transformer may use twelve (12) MSA layers and six (6) MLP layers regardless of the complexity of input images.

A vision transformer according to embodiments of the present disclosure can be used in various electronic devices that employ low-end processors. For example, the vision transformer can be deployed in a mobile device for image recognition and object detection. The vision transformer may provide a desired image classification result to a user with a higher speed than existing vision transformer. Additionally, the modality of the (vision) transformer can be switched from visual data to language data to process language queries. Further, the vision transformer according to embodiments may be used for processing visual data in a cloud platform with convolutional neural networks (CNNs).

While the embodiments of the disclosure have been described with reference to the figures, it will be understood by those of ordinary skill in the art that various changes in form and details may be made therein without departing from the spirit and scope as defined by the following claims.

What is claimed is:

1. An apparatus for performing image processing, the apparatus comprising:
 a memory storing instructions; and
 at least one processor configured to execute the instructions to:
  input an image to a vision transformer comprising a plurality of encoders that correspond to at least one fixed encoder and a plurality of adaptive encoders;
  process the image via the at least one fixed encoder to obtain image representations;
  determine one or more layers of the plurality of adaptive encoders to drop, by inputting the image representations to a policy network configured to determine layer dropout actions for the plurality of adaptive encoders; and
  obtain a class of the input image using remaining layers of the plurality of adaptive encoders other than the dropped one or more layers.

2. The apparatus of claim 1, wherein each of the plurality of encoders comprises a multi-head self-attention (MSA) layer and a multilayer perceptron (MLP) layer.

3. The apparatus of claim 1, wherein the layer dropout actions indicate whether each multi-head self-attention (MSA) layer and each multilayer perceptron (MLP) layer included in the plurality of adaptive encoders is dropped or not.

4. The apparatus of claim 1, wherein the policy network comprises a first policy network configured to determine whether to drop one or more multi-head self-attention (MSA) layers, and a second policy network configured to determine whether to drop one or more multilayer perceptron (MLP) layers.

5. The apparatus of claim 4, wherein the first policy network is configured to receive, as input, the image representations that are output from the at least one fixed encoder of the vision transformer, and output the layer dropout actions for each MSA layer of the plurality of adaptive encoders.

6. The apparatus of claim 5, wherein the second policy network is further configured to receive, as input, the image representations and the layer dropout actions for each MSA layer, and output the layer dropout actions for each MLP layer of the plurality of adaptive encoders.

7. The apparatus of claim 6, wherein the second policy network comprises a dense layer configured to receive, as input, a concatenation of the image representations and the layer dropout actions for each MSA layer.

8. The apparatus of claim 1, wherein the policy network is configured to receive a reward that is calculated based on a number of the dropped one or more layers, and image classification prediction accuracy of the vision transformer.

9. The apparatus of claim 8, wherein the at least one processor is configured to execute the instructions to:

calculate the reward using a reward function that increases the reward as the number of the dropped one or more layers increases and the image classification prediction accuracy increase.

10. A method of performing image processing, the method being performed by at least one processor, and the method comprising:
inputting an image to a vision transformer comprising a plurality of encoders that correspond to at least one fixed encoder and a plurality of adaptive encoders;
processing the image via the at least one fixed encoder to obtain image representations;
determining one or more layers of the plurality of adaptive encoders to drop, by inputting the image representations to a policy network configured to determine layer dropout actions for the plurality of adaptive encoders; and
obtaining a class of the input image using remaining layers of the plurality of adaptive encoders other than the dropped one or more layers.

11. The method of claim 10, wherein each of the plurality of encoders comprises a multi-head self-attention (MSA) layer and a multilayer perceptron (MLP) layer.

12. The method of claim 10, wherein the layer dropout actions indicate whether each multi-head self-attention (MSA) layer and each multilayer perceptron (MLP) layer included in the plurality of adaptive encoders is dropped or not.

13. The method of claim 10, wherein the determining the one or more layers of the plurality of adaptive encoders to drop, comprises:
determining whether to drop one or more multi-head self-attention (MSA) layers, via a first policy network; and
determining whether to drop one or more multilayer perceptron (MLP) layers, via a second policy network.

14. The method of claim 13, wherein the determining whether to drop the one or more multi-head self-attention (MSA) layers, comprises:
inputting the image representations that are output from the at least one fixed encoder of the vision transformer, to the first policy network; and
outputting the layer dropout actions for each MSA layer of the plurality of adaptive encoders, from the first policy network.

15. The method of claim 14, wherein the determining whether to drop the one or more multilayer perceptron (MLP) layers, comprises:
inputting, to the second policy network, the image representations and the layer dropout actions for each MSA layer; and
outputting the layer dropout actions for each MLP layer of the plurality of adaptive encoders, from the second policy network.

16. The method of claim 15, further comprising:
concatenating the image representations and the layer dropout actions for each MSA layer; and
inputting a concatenation of the image representations and the layer dropout actions for each MSA layer, to a dense layer of the second policy network.

17. The method of claim 10, wherein the policy network is trained using a reward function that calculates a reward based on a number of the dropped one or more layers, and image classification prediction accuracy of the vision transformer.

18. The method of claim 17, wherein the reward function increases the reward as the number of the dropped one or more layers increases and the image classification prediction accuracy increase.

19. A non-transitory computer-readable storage medium storing instructions that, when executed by at least one processor, cause the at least one processor to:
input an image to a vision transformer comprising a plurality of encoders that correspond to at least one fixed encoder and a plurality of adaptive encoders;
process the image via the at least one fixed encoder to obtain image representations;
determine one or more of multi-head self-attention (MSA) layers and multilayer perceptron (MLP) layers of the plurality of adaptive encoders to drop, by inputting the image representations to a policy network configured to determine layer dropout actions for the plurality of adaptive encoders; and
obtain a class of the input image using remaining layers of the plurality of adaptive encoders other than the dropped one or more layers.

20. The non-transitory computer-readable storage medium of claim 19, wherein the policy network is trained using a reward function that increases a reward in direct proportion to a number of the dropped one or more layers and image classification prediction accuracy of the vision transformer.

* * * * *